United States Patent
Tonello

(10) Patent No.: US 7,328,653 B2
(45) Date of Patent: Feb. 12, 2008

(54) INDUSTRIAL APPARATUS FOR APPLYING RADIO-FREQUENCY ELECTROMAGNETIC FIELDS TO SEMICONDUCTIVE DIELECTRIC MATERIALS

(75) Inventor: Alessandro Tonello, Cartigliano (IT)

(73) Assignee: Stalam S.p.A., Nove (Vicenza) (IT)

(*) Notice: Subject to any disclaimer, the term of this patent is extended or adjusted under 35 U.S.C. 154(b) by 0 days.

(21) Appl. No.: 10/515,972

(22) PCT Filed: May 28, 2002

(86) PCT No.: PCT/IT02/00340

§ 371 (c)(1),
(2), (4) Date: Aug. 4, 2005

(87) PCT Pub. No.: WO03/101153

PCT Pub. Date: Dec. 4, 2003

(65) Prior Publication Data

US 2006/0096466 A1    May 11, 2006

(51) Int. Cl.
*A23L 3/00* (2006.01)

(52) U.S. Cl. ............. 99/451; 99/358; 99/DIG. 14

(58) Field of Classification Search ........... 99/358, 99/451, 483, DIG. 14; 219/771–775, 778, 219/779; 426/237, 244, 521–523; 422/20; 159/DIG. 26
See application file for complete search history.

(56) References Cited

U.S. PATENT DOCUMENTS

| | | | |
|---|---|---|---|
| 918,531 A | 4/1909 | Goucher | |
| 2,508,365 A | 5/1950 | Bierwirth | |
| 2,510,796 A | 6/1950 | Brown | |
| 2,550,584 A | 4/1951 | Mittelmann | |
| 2,838,640 A | 6/1958 | Mann et al. | |
| 4,974,503 A | 12/1990 | Koch | |
| 5,562,024 A * | 10/1996 | Polny, Jr. | 99/451 |
| 5,571,550 A * | 11/1996 | Polny, Jr. | 426/244 |
| 5,583,960 A * | 12/1996 | Reznik | 392/321 |
| 5,630,360 A | 5/1997 | Polny, Jr. | |
| 5,636,317 A * | 6/1997 | Reznik | 392/312 |
| 5,758,015 A * | 5/1998 | Polny, Jr. | 392/318 |
| 5,768,472 A * | 6/1998 | Reznik | 392/321 |
| 5,771,336 A * | 6/1998 | Polny, Jr. | 392/321 |
| 5,834,746 A | 11/1998 | Pedersen et al. | |
| 5,863,580 A | 1/1999 | Reznik | |
| 6,303,166 B1 | 10/2001 | Kolbe et al. | |

FOREIGN PATENT DOCUMENTS

| | | |
|---|---|---|
| DE | 25 26 196 A1 | 12/1976 |
| EP | 0 457 179 A1 | 11/1991 |
| EP | 0 512 259 A2 | 11/1992 |
| EP | 0 651 590 A2 | 5/1995 |
| WO | WO 92/22180 | 12/1992 |
| WO | WO 98/27823 | 7/1998 |

* cited by examiner

*Primary Examiner*—Timothy F. Simone
(74) *Attorney, Agent, or Firm*—Flynn, Thiel, Boutell & Tanis, P.C.

(57) ABSTRACT

Industrial apparatus for applying radio-frequency electromagnetic fields to semiconductive dielectric materials comprises a radio-frequency voltage generator and an applicator device for applying radio-frequency electromagnetic fields. The applicator device comprises a plurality of electrodes electrically connected to the electrical generator for generating between then a radio-frequency electromagnetic field with electrical and magnetic components arranged in a preferential direction. The applicator device further comprises at least one pair of equipotential electrodes substantially aligned in the preferential direction and material transportation means for housing and transporting semiconductive dielectric material within the applicator device in a direction substantially parallel to the preferential direction.

15 Claims, 2 Drawing Sheets

INDUSTRIAL APPARATUS FOR APPLYING RADIO-FREQUENCY ELECTROMAGNETIC FIELDS TO SEMICONDUCTIVE DIELECTRIC MATERIALS

FIELD OF THE INVENTION

The present invention relates to an industrial apparatus and to an applicator device for applying radio-frequency electromagnetic fields to semiconductive dielectric materials. In particular, but in non-limiting manner, the apparatus can be used for heat-treating fluid food products, which are preferably of low viscosity and transportable by transportation means. More particularly, the apparatus can be used very advantageously in pasteurization or sterilization treatments of milk and its derivatives, as well as of fruit juices, beer, beverages of various types, shakes, soups, purees, flavouring syrups and tomato sauces.

BACKGROUND OF THE INVENTION

In many technological processes, and in particular in those in the food field, products may be subjected to a heat treatment in order to dry, dehydrate, defrost, cook, pasteurize, sterilize or otherwise treat them thermally. The heat to be supplied to the product may be transferred by means of external heat sources by utilizing convection, conduction or radiation effects, or may be generated directly within the product. In the latter case, an oscillating electromagnetic field can be used to produce a field of electrical currents in the product to be treated; by interacting with the material constituting the product, this field brings about a rise in its internal temperature. The electromagnetic field which can be applied may have various intensities and various oscillation frequencies.

Known apparatus which performs heating of this type comprises a radio-frequency generator which, when supplied with the mains voltage, produces an oscillating voltage of variable amplitude and of predetermined frequency at its output terminals. The apparatus further comprises an applicator device with capacitive or inductive behaviour which transforms the oscillating voltage of the generator into electromagnetic fields having predominantly electrical or magnetic components of the oscillating field, respectively. The above-mentioned frequencies are typically within ranges established by international standards, the central values of which are 6.78-13.56-27.12-40.68-433.92 MHz. The intensity of the oscillating electromagnetic fields thus generated depends on the amplitude of the radio-frequency voltage which is applied to the terminals of the applicator device and on the construction of the applicator device, which can increase or reduce the intensity of the field in the zones provided for housing the product to be treated.

There are known devices of various types which apply radio-frequency electromagnetic fields to products having different physical, dimensional and electrical characteristics. The most widespread applications relate to heat treatments of paper, fabrics, textile materials in general, particularly after dyeing, hides, rubber, wood, plastics laminates and food products. In most of these cases, the heating of the products takes place by dielectric losses due to the displacement currents which are induced in them by the electromagnetic field applied, rather than by the conduction currents. Bach of these devices has a structure and technical characteristics suitable for the frequency used and for the type of application required. Moreover, the same devices may have a structure such as to give rise to electromagnetic fields of predetermined intensities, delivering specific powers to the product on the basis of the particular heat treatment required.

For example, the Applicant's European patent application EP 0946104 describes an industrial apparatus for heating food products by means of a radio-frequency oscillating electromagnetic field. This apparatus can cook meat-based food products such as, for example, ham and the like, which have considerable mass and volume and are preferably placed in moulds.

One of the main limitations to the use of radio-frequency technology for heat treatment is that it is difficult to bring the products to be treated to high temperatures within extremely short times without thereby causing undesired effects detrimental to the products. For example, but in non-limiting manner, during pasteurization or sterilization processes, or during the defrosting of purees of food products, it is necessary to supply high powers within a short time and, in particular, high powers per unit volume of product, for continuous flows. This operation is particularly difficult, especially for semiconductive dielectric products, since their considerable electrical conductivity limits the effect of the dielectric losses, that is, the effect due to the displacement currents induced therein by the electromagnetic field applied.

Moreover, if the volume of product transported through the radio-frequency treatment zone per unit of time is particularly high, undesired chemical and organoleptic effects may arise in the products if the radio-frequency treatment time is not sufficiently short.

In some known solutions, it is possible to deliver high specific powers to the products in a short period of time with the use of high voltages and currents in the devices. However, these solutions lead to difficult management and complex control. In fact, the supply of high powers may lead to undesired electrical discharges between various points of the applicator devices, leading to damage thereto and to the product housed therein and, even more disadvantageously, may lead to uneven heating and/or burning of portions of the product.

Processes for pasteurization and/or sterilization of fluid food products should, in theory, comprise a first stage of instantaneous heating of the product to the pasteurization and/or sterilization temperatures, a subsequent stage characterized by a standing time reduced to zero and, finally, a stage of instantaneous cooling to the starting temperature. Since a process of this type cannot be achieved by known technology, the best conditions must be sought in dependence on the apparatus available in order to construct a plant which enables a process as similar as possible to the theoretical one to be achieved.

Thus, in the field of the heat treatment of milk, one of the most widespread pasteurization processes consists of a stage in which the milk is heated to a temperature below its boiling point, a stage in which the product is kept in these conditions for a predetermined period of time, and a cooling stage. The period of time at constant temperature must be long enough to kill pathogenic and sporiferous microorganisms of all types which are present and a proportion of micro-organisms which are not pathogenic but which can nevertheless bring about changes of various types in the product.

Some examples of known heat treatments are slow pasteurization (comprising, amongst other things, a stage of heating to 63°-65° C. and a maintenance stage of about 30 minutes) and quick pasteurization, known as H.T.S.T. (comprising, amongst other things, a stage of heating to 72° C. and a maintenance stage of about 20 seconds). Both processes serve to pasteurize milk intended for consumption or for the production of dairy products such as cheese, cream, butter, curd cheese and the like.

Another known type of method for the heat treatment of milk is that used when the product is intended for direct consumption. In this process, which is known as U.H.T. the milk is heated to temperatures much higher than the pasteurization temperature, which are maintained for a period of time much shorter than in the processes described above, for example, 155° C. for about 2-5 seconds. In this case, the object is to eliminate as far as possible everything which leads to a reduction in the shelf life of the product since, in this case, the milk must have a shelf life of at least 120 days when kept at ambient temperature. In U.H.T. treatment, the heating stage is usually achieved in two steps: first of all by an indirect exchange, for example, by means of external heat sources, such as plate-like hot-water heat-exchangers, and then by a direct exchange, for example, by the admission of steam into the milk at high temperature (known as the "uperization" stage)

Both of the treatments described above have some disadvantages. The use of steam at high temperature enables the product to be brought to the required temperatures quickly but at the same time leads to an alteration in its physical and organoleptic characteristics. In fact, the steam admitted not only changes the percentage of water in the milk, but also leads to depletion of the nutritional substances since, once the required temperature has been reached, the same amount of steam which was injected is extracted, together with some substances which were originally contained in the milk. It is therefore an invasive technique in which an external element, the steam, is used to achieve extremely quick heating times which cannot be achieved by other known techniques. In contrast, indirect exchange treatment does not modify the chemical characteristics of the product, since it is not an invasive process, but is not as effective in reaching the required temperatures within a short time, thus causing serious and undesired side effects in the pasteurized milk.

In the said processes, it is also known that, for a given maximum treatment temperature, the milk-sterilization effect can also be achieved with a limited duration of the maintenance stage, which is responsible for the organoleptic degradation of the product, if the required temperatures are reached within the shortest possible time. It is clear that, with known techniques, there are physical limitations to this which are connected with the technologies used. For example, indirect exchange of heat by means of heat exchangers requires sufficiently long periods of contact between the product and the heating means for the product to be heated completely and uniformly in order to ensure complete treatment thereof.

It is known that, over the years, the temperatures necessary to achieve correct sterilization of milk are continually increasing because of new contaminations connected with new pathogenic agents, spores, enzymes, bacteria, or microorganisms. These harmful substances are in fact becoming ever more heat-resistant and hence difficult to inactivate. However, excessive heat treatment clearly conflicts with the ever greater requirement by the public for products with flavours, odours and colours which are as close as possible to their natural properties. These reasons have forced and are forcing many companies producing sterilization plant or fluid foods to investigate, implement and use ever newer and more sophisticated technological processes connected with the improvement of plant, with the use of heat sources which make use of convection, conduction or radiation effects. In this connection, it is widely believed that the known technologies have reached such a high degree of development that they can now be considered "mature techniques" which are ever more difficult to improve.

The main object of the present invention is to overcome the disadvantages of known apparatus by providing an industrial apparatus for applying radio-frequency electromagnetic fields to semiconductive dielectric materials which can treat large quantities of product very quickly without bringing about particular changes in its physical, chemical and organoleptic characteristics.

Another object of the present invention is to provide an industrial apparatus for the heat treatment of semiconductive dielectric materials which can apply radio-frequency electromagnetic fields of considerable intensity with the use of limited voltages and currents in the apparatus so as to be easy to manage and control, avoiding unnecessary loadless power dissipation and localized heating, and consequently burning, of the product.

A further object of the present invention is to provide an industrial apparatus for applying radio-frequency electromagnetic fields to semiconductive dielectric materials which can easily apply fields of greater or lesser intensity for times adjustable over an extremely wide range and which can thus be used in various technological processes which may even involve products other than food products.

Another object of the present invention is to provide an industrial apparatus which is easy and inexpensive to manufacture, easy to inspect, easily accessible for cleaning and maintenance operations, and easy to dismantle.

To achieve the objects indicated above, the subject of the invention is an apparatus having the characteristics indicated in the appended claims.

According to a particularly advantageous characteristic of the present invention, the industrial apparatus comprises means for housing and transporting the products to be treated, which means can be connected easily and quickly to the means used for transporting the products in production lines. The apparatus of the present invention can thus be inserted in production lines for fluid products, preferably of low viscosity, transported in sterile pipes, without altering the layout and configuration of the existing devices or even the cross-section and/or configuration of the lines and pipes for transporting the products.

Another advantage of the present invention is that products flowing through production lines at extremely fast speeds can be treated industrially without the provision of additional applicator devices and/or plants. As well as having large dimensions and therefore being difficult to use and to maintain, these additional devices generally require large volumes of product in the radio-frequency treatment zones and therefore involve treatment times which are so long that they cause undesired chemical/organoleptic effects in the products.

BRIEF DESCRIPTION OF THE DRAWINGS

Further characteristics and advantages of the present invention will become clear from the following detailed description of a preferred embodiment, given with reference to the appended drawings, provided purely by way of non-limiting example, in which.

DETAILED DESCRIPTION

Figure 1:
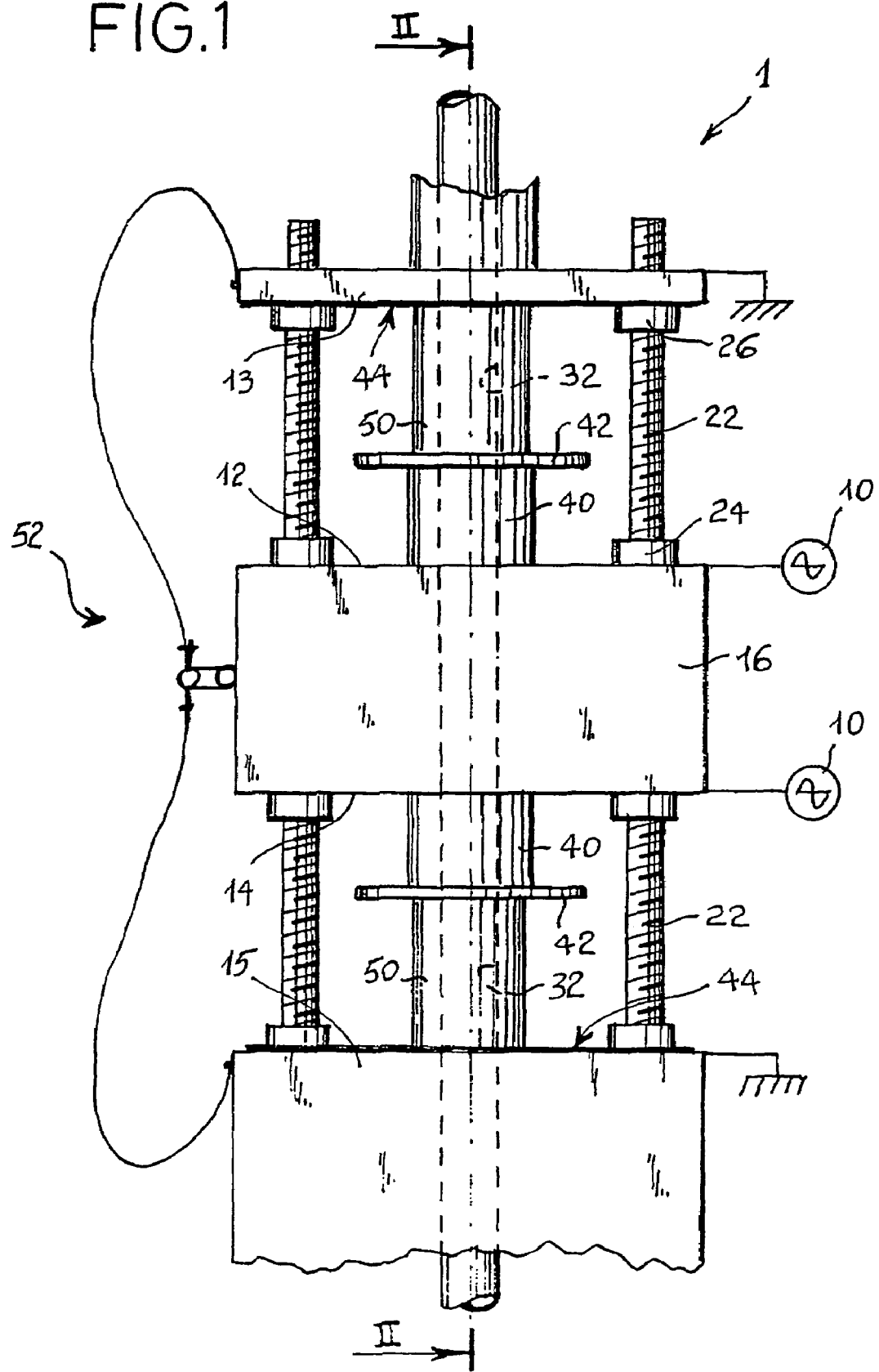
FIG. 1 is a schematic side view of the apparatus of the present invention.

With reference now to the drawings, an industrial apparatus for applying radio-frequency electromagnetic fields to semiconductive dielectric materials comprises a conventional electrical generator 10 which produces at its terminals an oscillating voltage of predetermined amplitude and with a predetermined frequency within the typical radio-frequency range, for example, but in non-limiting manner, from a few kHz to a few hundred MHz.

The voltage produced by the radio-frequency generator 10 supplies an applicator device 1, the configuration of which enables a radio-frequency electromagnetic field of considerable intensity to be generated inside it. The material to be subjected to heat treatment, for example, but in non-limiting manner, semiconductive food products, preferably milk during pasteurization or sterilization treatments, is passed through the applicator device 1 in a manner such that the electromagnetic field heats it to a predetermined temperature and for a predetermined period of time.

It is very important for milk, as for most food products which are transported in a production line, to be contained in sterile pipes to prevent any contact with the air and, in general, with external agents which might damage its chemical and physical properties.

The industrial apparatus of the present invention comprises inlet means and outlet means which are connected in sealed manner to the pipes for transporting the material so as not to cause the above-mentioned problems. This characteristic further facilitates the insertion of the apparatus of the present invention in industrial production lines, since it does not require modification either of the structure or of the layout or even of the configuration of the devices present therein.

The applicator device 1 of the present invention comprises at least one pair of electrodes and, preferably, as shown in the drawings, two pairs of electrodes 12, 13 and 14, 15, the surfaces of which are formed, for example, but in non-limiting manner, by plates of electrically-conductive material, preferably stainless steel, arranged opposite and parallel to one another. Each pair of electrodes comprises a first plate 12, 14, electrically connected to one terminal of the generator 10 and a second plate 13, 15, electrically connected to a terminal of different potential such as, for example, the other terminal of the generator 10, or preferably, to earth. The first plates 12, 14 of each pair of electrodes are electrically connected to one another, for example, by means of two connecting elements 16, also made of electrically-conductive material and disposed at their ends so as to be equipotential, that is, so as to be kept at the same electrical potential. The other two plates 13, 15, which are connected to earth, are arranged facing and opposite the first two equipotential plates 12, 14. In use, a first electromagnetic field generated between the plate 12 and the plate 13 has flow lines which are oriented in a preferential direction that is substantially perpendicular to the surfaces of the plates. Similarly, a second electromagnetic field generated between the plate 14 and the plate 15 has flow lines which are also oriented substantially in the said preferential direction. Finally, the pair of equipotential electrodes 12, 14 connected to the generator 10 defines a plane substantially perpendicular to the said preferential direction.

Naturally, the number, shape and dimensions of the electrodes 12, 13, 14, 15 and of the connecting elements 16, as well as the above-described electrical connections, may vary widely from those shown in the appended drawings, without thereby departing from the scope and from the objects of the present invention.

Each plate 12, 13, 14, 15 comprises a plurality of openings 30 in which are inserted means for housing and transporting food products, for example, but in non-limiting manner, a duct made of insulating material, preferably a pipe 32 made of plastics material. The food product thus passes through the applicator device 1 in a preferential direction substantially parallel to that of the lines of the electromagnetic field generated in the applicator device 1, and the two electrodes 12, 14 are arranged substantially in alignment in the preferential direction.

Application means, for example, but in non-limiting manner, metal cylinders 40, are engaged with each plate, for example, but in non-limiting manner, are fitted in the openings 30 in a manner such as to encircle the pipes 32 transporting the product to be treated. The inside diameter of the transporting pipes 32, and consequently of the metal cylinders 40, may advantageously be selected on the basis of the cross-sections of the pipes used in the production treatment lines. Any irregularities between the internal surfaces of the various pipes are thus eliminated, preventing accidental deposition of portions of product subjected to treatment. Prolonged deposition and consequent deterioration of such portions of product could in fact lead to organic contamination of the product subject to treatment, for example, rendering its sterilization impossible.

The metal cylinders 40 also have a reinforcing function for preventing damage to the transporting pipes 32. The thermal shock which the material subject to treatment undergoes in the equipotential ducts tends to change its volume, creating a bulge in the transporting pipe 32. Since the transporting pipes are preferably made of insulating material and generally of flexible plastics material, repeated deformation of their walls could lead to changes in the pressure inside the pipes, a loss of elasticity, or even tearing of the plastics material, with consequent leakages of the material.

The metal cylinders 40 comprise respective abutment elements, for example, but in non-limiting manner, abutment projections 42 which enable a minimum distance, beyond which it is not possible to move the plates of the electrodes 12, 13, 14, 15 towards one another, to be preset. This minimum distance prevents undesired side effects which might arise at particular operating frequencies of the apparatus if the electrodes were moved too close together.

The applicator device 1 also comprises further means for reinforcing the transporting pipe 32, for example, but in non-limiting manner, cylinders 50 made of insulating material, preferably Teflon, which enclose the portions of the transporting pipe 32 disposed between the abutment projections 42. The plastics cylinders 50 thus increase the retaining quality of the transporting pipes 32 should products be transported at high pressure inside the industrial apparatus.

The transporting means 32, the application means 40, and the reinforcing means 50 may be formed with different dimensions and geometrical shapes, according to the type of product or the technological processes in which the present invention is used. This is important to ensure adequate flexibility of the industrial apparatus and hence its applicability to various technological processes.

In the embodiment shown in the drawings, the applicator device 1 comprises support means, for example, but in non-limiting manner, two "L"-shaped metal plates 18 which also enable one of the two plates of the first pair of electrodes to be connected to the earth potential. The remaining plates 12, 13, 14 are supported on the second plate 15 of one of the electrodes by support elements made of insulating materials, preferably Teflon, so as not to interfere with the electromagnetic field present between the two pairs of electrodes. Each support element comprises, for example, a threaded bar 22 connected to the two second plates 13, 15 of the pairs of electrodes by means of locating elements 26. Further pairs of locating elements 24 are engaged on the bar 22 and support the first plates 12, 14, respectively, in a manner such that their relative distance can be varied. Naturally, the support elements may comprise or be replaced by other means of known type which a person skilled in the art could easily identify, once their function has been understood from the present description and as long as they enable the relative distance between the plates 12, 13, 14, 15 of the applicator device 1 to be varied. A particular advantage of these support elements is in fact that it is possible to vary the intensity of the electromagnetic field applied to the product, as well as its treatment time, by varying the volume of the product which is subjected to the action of the radio-frequency electromagnetic field per unit of time.

Figure 2:
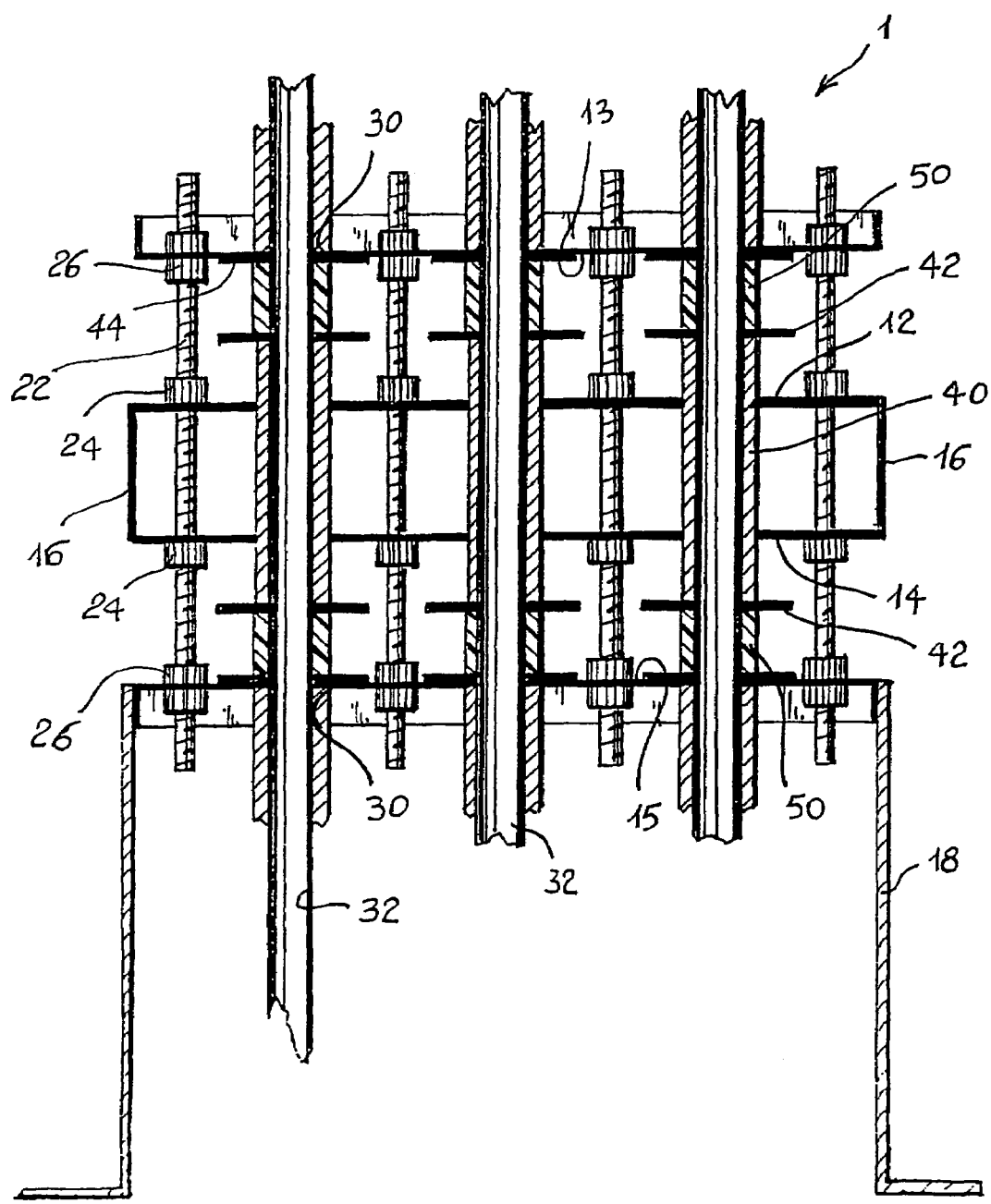
FIG. 2 is a schematic view of the apparatus of the present invention, sectioned on the line II-II of FIG. 1.

As shown in FIG. 1, a layer of insulating material 44 is applied to the plates 13 and 15 so as to prevent the formation of any electric arcs between the ends of the metal ducts and between the pairs of electrodes. The insulating layers 44 are not shown in FIG. 2, for greater clarity of illustration.

In use, when the electrical generator 10 produces an oscillating voltage of predetermined amplitude and with a predetermined frequency at its terminals, a first electromagnetic field is generated between the plate 12 and the plate 13 and has flow lines which are oriented in a preferential direction substantially perpendicular to the surfaces of the plates.

Similarly, a second electromagnetic field is generated between the plate 14 and the plate 15 and has flow lines which are also oriented substantially in the preferential direction. The food product is housed and transported in the pipes 32 and passes through the applicator device 1 in a preferential direction substantially parallel to that of the lines of the electromagnetic field generated in the applicator device 1.

The metal cylinders 40 enable the opposite, or different, potentials of the electrodes to be carried along the walls of the pipes 32. The product under treatment is thus subjected to the effect of an electromagnetic field, the field lines of which are applied substantially in the direction in which the product flows and which is rendered particularly intense by the equipotentiality and by the length of the metal ducts. The lines of an electric field in fact never intersect one another and the electric field lines generated inside the equipotential metal ducts, the length of which is predominant in comparison with their diameter, therefore have a considerable intensity and must close either onto surfaces of the same shape as that mentioned above or even different surfaces, provided that they are of different potential.

This electromagnetic field produces currents substantially of two types in the product housed in the device, that is: a first type known as displacement currents and a second type known as conduction currents. The first is due to the dielectric displacement of the substances constituting the product, which is caused by the oscillations of the alternating electromagnetic field applied (like a type of molecular oscillation). It thus acts on portions of product which are not free ionic charges, bringing about molecular oscillations, and the molecular friction between the various molecules thus produces heat (dielectric heating). The second type is due to the conduction of the free ionic charges which are present in the product, such as to render it semiconductive, and is caused by the radio-frequency potential difference applied to the product since the capacitive effect of the walls of the pipe 32 allows the radio-frequency current to pass through it. By thus acting on ionic charges which are free to move in the product, this current causes heating by the Joule effect. The two currents are both at the typical frequency of the radio-frequency generator which supplies the applicator device 1. Clearly, the two currents are electrically out of phase with one another by 90° since one is capacitive and the other is resistive. Naturally, the lengths of the metal ducts enable a larger electromagnetic field to be applied to the product.

The distance between the pairs of electrodes 12, 13 and 14, 15 and hence of metal ducts 40 advantageously enables the treatment times of the product to be reduced since there is a smaller volume of product disposed between the metal ducts having different electrical potentials.

A configuration of this type is particularly advantageous for the heat treatment of semiconductive materials such as, for example, milk, with radio-frequency electromagnetic fields. In fact, the heat treatment takes place in very short times and much more homogeneously than in any other known device, even when the material passes through the applicator device 1 at fast speeds, as in the case of a continuous line for transporting milk.

Moreover, the ability of the applicator device 1 to concentrate high-intensity electromagnetic fields in a small space enables the generator 10 to supply the applicator device 1 with voltages low enough to eliminate the risks of undesired electrical discharges which could damage the pipes transporting the material or cause burning of the product, without thereby limiting the intrinsic characteristic of heating the material very rapidly to high temperatures within very short periods of time.

Naturally, the applicator device 1 may also comprise more than one pipe so as to increase the volume of material to be subjected to heat treatment within the same period of time, or several pipes of different cross-section, so as to fit the dimensions of the pipes transporting material at the input and/or the output of the industrial apparatus of the present invention.

An important technical characteristic of the present invention is that the electrodes 12, 13, 14, 15 and the metal ducts 40 connected thereto, that is, the ends of the applicator device 1, are all connected to earth. This prevents the flow of undesired electrical currents through the product under treatment, outside the applicator device 1, which currents are greater the more conductive the product is, causing undesired side effects such as electromagnetic interference with probes immersed in the product, or difficulties in screening, that is, in containing the radio-frequency electromagnetic field within the apparatus. Moreover, the entire apparatus is electrically insulated from the production line and from its component devices and, for obvious safety reasons, avoids any dispersal of current to the exterior. Moreover, since the electrical potential of the material to be treated is in practice at the earth potential outside the ends of the applicator device 1, metal tubing, particularly stainless-steel tubing, can advantageously be connected to the pipe 32, thus enabling the device to be incorporated perfectly well in production lines in which stainless steel tubing is often used. Another advantage of the interposition of insulating material at the ends of the applicator device is the solving of problems of screening and of limiting leakage currents and interference in electrical devices connected to the apparatus such as, for example, probes, inverters, PLCs and the like.

Phase-modifying means formed, for example, but in non-limiting manner, by inductances 52, which are necessary for adapting the load of the device to the radio-frequency generator 10, may be disposed between the generator 10 and the earth, that is, between the second plates 13, 15 and the pair of equipotential plates 12, 14. The inductances 52 may be formed, for example, but in non-limiting manner, by tubes, preferably of silvered copper, of a thickness greater than the depth of penetration of the working radio-frequency currents of the apparatus. Moreover, one or more adjustment elements may advantageously be connected to each inductance so as to form longer or shorter paths for the currents and for the respective magnetic flux linkage, on the basis of their position, thus adjusting the phase-modifying current and hence the radio-frequency voltage range necessary for the type of product to be treated. This characteristic is particularly useful since it renders the use of the apparatus extremely flexible for products possibly having notably different electrical and dielectric characteristics.

The phase-modifying means also perform the load-adaptation function and have been designed in accordance with the criterion of converting the impedance from the value obtained from the system comprising the radio-frequency applicator device 1 with the product housed therein, to the utilizable impedance of the generator, in order to maximize the transfer of power between the generator and the load.

The circulation of radio-frequency currents in the structure of the applicator device can also be reduced to the values which are strictly necessary for the generation of the electromagnetic field in the pipes 32 by the interposition of a suitable load-adaptation network between the generator 10 and the applicator device 1, as well as by the above-mentioned phase-modifying means. Undesired radiation of radio-frequency power outside the physical limits of the applicator device can thus be prevented, thus also limiting loadless losses which would otherwise arise, leading to unnecessary power dissipation and more or less localized hot spots inside the device.

The radio-frequency generator 10 may comprise a system of known type for adjusting the power delivered, for example, by limiters of the amplitude of the mains voltage supplied to the generator, or a system for transforming impedance by means of a capacitive, inductive, mutual inductive, or impedance-transformation coupling between the generator and the applicator device. These systems for regulating the power of the generator can advantageously be controlled by electronic devices which, by detecting the temperature of the product at the input and/or at the output of the applicator device by means of temperature sensors, can keep the output product temperature stable or vary it by providing feedback to the generator power-regulation system.

An alternative feedback system may be, for example, that of keeping the radio-frequency power delivered to the product stable at a predetermined value with variations either of the speed of the product or of the type of product treated. Naturally, the controls described above are only some of the feedback controls which may be used for the present invention. Similarly, electronic supervision and control devices which are normally used in automation and are commonly present in production lines such as, for example PLC or PC devices and the like, may also be incorporated in the apparatus of the present invention.

Naturally, the principle of the invention remaining the same, the forms of embodiment and details of construction may be varied widely without thereby departing from the scope of the present invention.

The invention claimed is:

1. An apparatus for applying radio-frequency electromagnetic fields to semiconductive dielectric materials, said apparatus comprising an applicator device including a plurality of electrodes which are connected, in use, to an electrical generator for generating between said electrodes a radio-frequency electromagnetic field comprising electrical and magnetic components arranged in a preferential direction, material transportation means for housing and transporting a semiconductive dielectric material, said plurality of electrodes comprising a first pair of electrodes connected electrically to the earth potential in use, and a second pair of equipotential electrodes electrically connected to the generator in use, and connecting elements connected to said second pair of electrodes so as to keep both of the electrodes of said second pair of electrodes at the same potential, said second pair of electrodes being arranged substantially in alignment in the preferential direction and between the respective electrodes of said first pair of electrodes, the transportation means transporting the material, within the applicator device, in a direction substantially parallel to the preferential direction, wherein each electrode comprises an electrically-conductive plate in which at least one opening is formed, the transportation means being inserted in the opening in order to extend through the plates in the preferential direction, and application means engaged with at least one of said pairs of electrodes and disposed in the vicinity of the transportation means.

2. The apparatus of claim 1, wherein the application means comprises metal cylinders.

3. The apparatus of claim 2, wherein lengths of the metal cylinders are predominant in comparison with diameters of the metal cylinders.

4. The apparatus of claim 1, said applicator device further comprising reinforcing means arranged around the transportation means for preventing deformation of the transportation means in use owing to thermal shock of the material contained therein.

5. The apparatus of claim 4, wherein the reinforcing means comprises cylinders made of insulating material.

6. The apparatus of claim 5, said applicator device further comprising several transportation means connectible to one another in series or in parallel.

7. The apparatus of claim 1, said applicator device further comprising support means for supporting the pairs of electrodes, the support means enabling the relative distance between the electrodes to be varied selectively, in use.

8. The apparatus of claim 7, wherein the support means comprises vertical plates disposed to support one of the electrodes of said first pair of electrodes and to connect said one electrode to the earth potential, and the remaining electrodes are supported on said one electrode.

9. The apparatus of claim 8, wherein the support means is configured to permit the electrodes to be horizontally displaced with respect to the vertical plates.

10. The apparatus of claim 1, further comprising a radio-frequency voltage generator for generating the radio-frequency electromagnetic field between said electrodes.

11. The apparatus of claim 10, further comprising selectively adjustable phase-modification means disposed between at least one pair of electrodes for displacing the phase of the electrical potentials of the at least one pair of electrodes relative to one another in use.

12. The apparatus of claim 10, wherein each electrode of the applicator device can be connected to a load-adaptation network constructed by means of passive resistive, inductive, and/or capacitive electrical elements, and disposed between the electrical generator and the applicator device.

13. The apparatus of claim 10, wherein the voltage generator can generate a radio-frequency voltage or current with a frequency of between 1 kHz and 1 GHz at its terminals.

14. The apparatus of claim 1, wherein said electrode plates each define a substantially flat surface area of a substantially greater dimension than a diameter of said transportation means.

15. The apparatus of claim 14, wherein said transportation means comprises a pipe which is a separate component from said electrodes.

* * * * *